(12) United States Patent
Dai et al.

(10) Patent No.: US 9,503,700 B2
(45) Date of Patent: Nov. 22, 2016

(54) PHOSPHOR WHEEL AND PROJECTOR HAVING THE PHOSPHOR WHEEL

(71) Applicant: Coretronic Corporation, Hsin-Chu (TW)

(72) Inventors: Jia-Hong Dai, Hsin-Chu (TW); Tung-Chou Hu, Hsin-Chu (TW); Tsung-Ching Lin, Hsin-Chu (TW)

(73) Assignee: CORETRONIC CORPORATION, Hsin-Chu (TW)

( * ) Notice: Subject to any disclaimer, the term of this patent is extended or adjusted under 35 U.S.C. 154(b) by 58 days.

(21) Appl. No.: 14/505,999

(22) Filed: Oct. 3, 2014

(65) Prior Publication Data

US 2015/0229892 A1 Aug. 13, 2015

(30) Foreign Application Priority Data

Feb. 7, 2014 (CN) .......................... 2014 1 0044930

(51) Int. Cl.
| | |
|---|---|
| *G03B 21/20* | (2006.01) |
| *H04N 9/31* | (2006.01) |
| *G02B 26/00* | (2006.01) |
| *G03B 21/16* | (2006.01) |

(52) U.S. Cl.
CPC .......... *H04N 9/3144* (2013.01); *G02B 26/008* (2013.01); *G03B 21/16* (2013.01); *G03B 21/204* (2013.01); *H04N 9/3114* (2013.01); *H04N 9/3158* (2013.01)

(58) Field of Classification Search
CPC ...... G03B 21/20; G03B 26/00; G03B 21/14; G03B 21/16; H04N 9/31; F21V 14/08; F21V 9/10
See application file for complete search history.

(56) References Cited

U.S. PATENT DOCUMENTS

| | | | |
|---|---|---|---|
| 6,618,213 B2 | 9/2003 | Inamoto | |
| 7,018,051 B2 | 3/2006 | Bok | |
| 2003/0156262 A1 | 8/2003 | Baker et al. | |
| 2004/0145707 A1* | 7/2004 | Lee | G03B 21/28 353/84 |

(Continued)

FOREIGN PATENT DOCUMENTS

| | | |
|---|---|---|
| CN | 1797181 A | 7/2006 |
| CN | 101359076 A | 2/2009 |

(Continued)

OTHER PUBLICATIONS

State Intellectual Property Office of the People's Republic of China, "Office Action", issued on Mar. 3, 2016.

*Primary Examiner* — Sultan Chowdhury
*Assistant Examiner* — Danell L Owens
(74) *Attorney, Agent, or Firm* — WPAT, PC; Justin King; Douglas Hosack

(57) ABSTRACT

A phosphor wheel includes a rotating disk and a wavelength converting layer. The rotating disk has a first surface and a second surface opposite to the first surface, in which the first surface forms a coating region and a non-coating region. The wavelength converting layer is formed on the coating region of the first surface for converting a light wavelength of a light beam. In addition, an embodiment of the invention discloses a projection device having the phosphor wheel. When the rotating disk of the phosphor wheel rotates, the recess portion may disturb the air around the phosphor wheel such that the temperature of the wavelength converting layer may be effectively decreased. Simultaneously, the rotating disk has a stable dynamic balance and the rotating disk has a larger heat dissipating region because the recess portion is disposed on the rotating disk.

15 Claims, 7 Drawing Sheets

(56) References Cited

U.S. PATENT DOCUMENTS

| | | |
|---|---|---|
| 2006/0066817 A1 | 3/2006 | Chin et al. |
| 2007/0030583 A1 | 2/2007 | Lin |
| 2009/0034105 A1 | 2/2009 | Ho |
| 2010/0245777 A1* | 9/2010 | Ogura ................ G02B 5/0215 353/38 |
| 2011/0149549 A1* | 6/2011 | Miyake .................. F21V 7/22 362/84 |
| 2013/0169938 A1* | 7/2013 | Huang ................ G03B 21/16 353/31 |

FOREIGN PATENT DOCUMENTS

| | | |
|---|---|---|
| CN | 102141715 A | 8/2011 |
| CN | 102853377 A | 1/2013 |
| CN | 103226283 A | 7/2013 |
| CN | 203489181 U | 3/2014 |
| CN | 103900035 A | 7/2014 |
| JP | 2011128521 A | 6/2011 |
| TW | 520041 | 2/2003 |
| TW | I297418 | 6/2008 |

* cited by examiner

PHOSPHOR WHEEL AND PROJECTOR HAVING THE PHOSPHOR WHEEL

FIELD OF THE INVENTION

The invention relates to a phosphor wheel, and more particularly to a phosphor wheel having a heat dissipating structure.

BACKGROUND OF THE INVENTION

The projector is a common optoelectronic display device and is widely applied in several occasions such as the life entertainment, the academic lecture, the business show. According to the principles of displaying, the projecting system includes a cathode-ray tube (CRT) display device, a liquid crystal display (LCD), a digital light processing (DLP) projecting device, and a liquid crystal on silicon (LCoS) projecting device, in which the DLP projecting device enjoys customers' high praise and shares the major market about the projecting system products because of the advantages of the DLP projecting device such as the high luminance, the high chromatic fidelity, the high response efficiency, and the compact configuration.

The DLP projecting device usually has a digital micromirror device (DMD) to modulate the light and passes an image through the projecting lens to project the image on the screen, in which the single-chip DLP projector and the double-chips DLP projector both have color wheels to separate the colors of the light to form color displaying images. In the preferred condition, the image projected by the projector may have a wide color gamut, a high brightness, and an ideal white balance because of the color wheel of the projector.

The conventional color wheel includes a plate and a phosphor layer disposed on the plate. The phosphor layer has a shining light area and the shining light area may be extended when the plate rotates. Simultaneously, the phosphor layer of the color wheel may be stained with the dust to cause the optical efficiency decreased. Therefore, the color wheel must be disposed in an enclosed cavity to prevent from the entering of the dust. However, owing to the needing of the high brightness, the projector has a high energy light source such that the temperature of the cavity may be increased to cause the optical efficiency of the phosphor layer being decreased and the gel for adhering the phosphor layer on the plate may be burned when the phosphor layer is disposed in an over-high temperature.

Recently, some patents are descript to be configured to decrease the temperature of the color wheel when the plate of the color wheel rotates such as U.S. Pat. No. 7,018,051 and US publication number 20130169938. However, the mentioned patents are descript that several holes or extra structures are disposed on the plates such that the air rapidly follows to accelerate the heat dissipation of the plate, but the configuration of the plate is dramatically changed to cause the rotatable plate having an unstable dynamic balance. In addition, the heat dissipating region of the plate may be decreased because the plate has several holes. Furthermore, the manufacture of the plate may need many complex processes.

SUMMARY OF THE INVENTION

The invention provides a phosphor wheel to solve the problems caused by the prior art.

According to an embodiment of the invention, a phosphor wheel includes a rotating disk and a wavelength converting layer. The rotating disk has a first surface and a second surface opposite to the first surface, in which the first surface forms a coating region and a non-coating region. The rotating disk has at least one recess portion, in which the recess portion is formed on the second surface or the non-coating region of the first surface. The wavelength converting layer is formed on the coating region of the first surface.

According to another embodiment of the invention, the phosphor wheel further includes an actuated device connected to the rotating disk for actuating the rotating disk to rotate.

According to another embodiment of the invention, the rotating disk has a light transmissive hole.

According to another embodiment of the invention, the wavelength converting layer has a first wavelength converting material for converting the light beam into a first wavelength light beam and a second wavelength converting material for converting the light beam into a second wavelength light beam.

According to another embodiment of the invention, the coating region is formed on an outer edge of the first surface.

According to another embodiment of the invention, a shape of the recess portion is circular, rectangular, or curved, etc.

According to another embodiment of the invention, a maximum thickness of the rotating disk is about 0.85 mm and a minimum thickness of the rotating disk is about 0.5 mm.

According to another embodiment of the invention, a projection device includes a light emitting element, a phosphor wheel, a light valve, and a projecting lens. The light emitting element is configured for emitting a light beam. The phosphor wheel is disposed on a transmission path of the light beam and the phosphor wheel includes a rotating disk and a wavelength converting layer. The rotating disk has a first surface and a second surface opposite to the first surface, in which the first surface forms a coating region and a non-coating region. The rotating disk has at least one recess portion, in which the recess portion is formed on the second surface or the non-coating region of the first surface. The wavelength converting layer is formed on the coating region of the first surface for converting a light beam into a wavelength converting beam such that the light beam is mixed with the wavelength converting beam to form a mixed light beam. The light valve is disposed on a transmission path of the mixed light beam and configured to modulate the mixed light beam into an image light beam. The projecting lens is disposed on a transmission path of the image light beam.

According to another embodiment of the invention, the phosphor wheel includes an actuated device connected to the rotating disk for actuating the rotating disk to rotate.

According to another embodiment of the invention, the projection device further includes a cover for containing the phosphor wheel.

According to another embodiment of the invention, the coating region has a light transmissive hole for penetration of the light beam.

According to another embodiment of the invention, the wavelength converting layer has a first wavelength converting material for converting the light beam into a first wavelength light beam and a second wavelength converting material for converting the light beam into a second wavelength light beam.

According to another embodiment of the invention, the coating region is formed on an outer edge of the first surface.

According to another embodiment of the invention, a shape of the recess portion is circular, rectangular or curved.

According to another embodiment of the invention, a maximum thickness of the rotating disk is about 0.85 mm and a minimum thickness of the rotating disk is about 0.5 mm.

In the embodiment, when the rotating disk of the phosphor wheel rotates, the recess portion may disturb the air around the phosphor wheel such that the temperature of the wavelength converting layer may be effectively decreased. Simultaneously, the configuration of the rotatable plate is not dramatically changed and do not have extra holes, and thus the rotating disk can have a stable dynamic balance when the rotating disk rotates. In addition, the rotating disk has a larger heat dissipating region because the recess portion is disposed on the rotating disk.

BRIEF DESCRIPTION OF THE DRAWINGS

The invention will become more readily apparent to those ordinarily skilled in the art after reviewing the following detailed description and accompanying drawings, in which.

DETAILED DESCRIPTION OF PREFERRED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
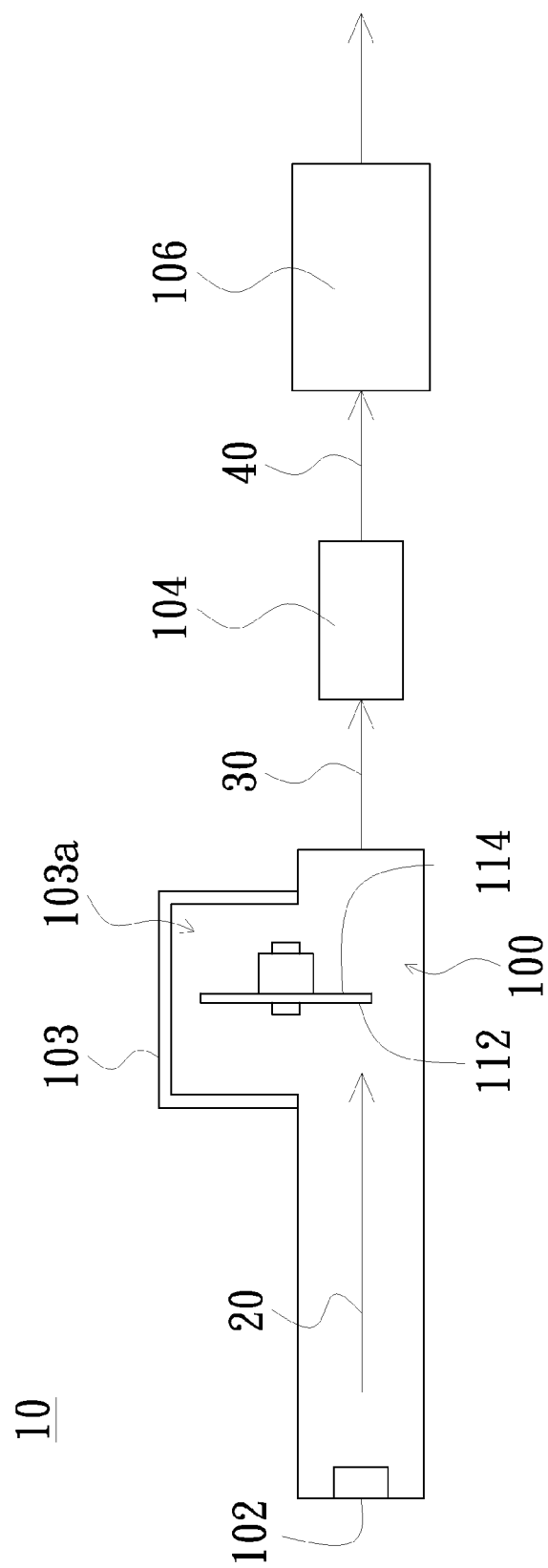
FIG. 1 illustrates a schematic view of a projector according to an embodiment of the invention.

Referring to FIG. 1, it shows a schematic view of a projection device 10 according to an embodiment of the invention. As shown in FIG. 1, the projection device 10 includes a light emitting element 102, a phosphor wheel 100, a light valve 104, and a projecting lens 106. The light emitting element 102 of the projection device 10 emits a light beam 20 and the light beam 20 is projected onto a screen (not shown) through being processed by the phosphor wheel 100, the light valve 104, and the projecting lens 106.

The light emitting element 102 is configured for emitting the light beam 20. In this embodiment, the light emitting element 102 may be, but not limited to, a light emitting diode or a laser source. For example the lighting emitting element 102 may be, but not limited to, a blue laser.

The phosphor wheel 100 is disposed on a transmission path of the light beam 20 for converting the light beam 20 into a wavelength converting beam such that the light beam 20 is mixed with the wavelength converting beam to form a mixed light beam 30. In the other words, the wavelength of the light beam 20 emitted by the light emitting element 102 may be changed via the phosphor wheel 100 to form another color light beam with different wavelength. It should be understood FIG. 2~FIG. 7 would shows furthering structure features of the phosphor wheel 100. In addition, the projection device 10 may includes a cover 103 for containing the phosphor wheel 100 in a cavity 103a formed by the cover 103 to prevent the phosphor wheel 100 from being stained with the dust to cause the optical efficiency being decreased. Furthering, the cover 103 may have a highly heat conductivity so that the high temperature in the cavity 103a may be conducted into an outer of the cover 103 via the heat exchange. For example, the material of the cover 103 may be, but not limited to, a metal.

Owing that the light valve 104 is disposed on a transmission path of the mixed light beam 30, the mixed light beam 30 may be modulated into an image light beam 40 via the light valve 104 after the light beam 20 is mixed with the wavelength converting beam to form a mixed light beam 30 via the phosphor wheel 100. The image light beam 40 may be projected into the screen (not shown) after the image light beam 40 is passed through the projecting lens 106 disposed on a transmission path of the image light beam 40. Therefore, when the phosphor wheel 100 rotates rapidly, the user may see an image composited with several colors owing to the persistence of vision.

It should be understood that the numbers and the dispositions of the phosphor wheel 100 is only exemplification of the invention and not limited to implement the invention. In addition, the projection device 10 may includes others optical elements on a light transmission path between the light emitting element 102 and the light valve 104. For example, the optical elements for transmitting or mixing with the light beam 20 may be, but not limited to, lens, reflective mirrors, and so on. Simultaneously, the projecting lens 106 may, but not be limited to, include another optical element.

Figure 2:
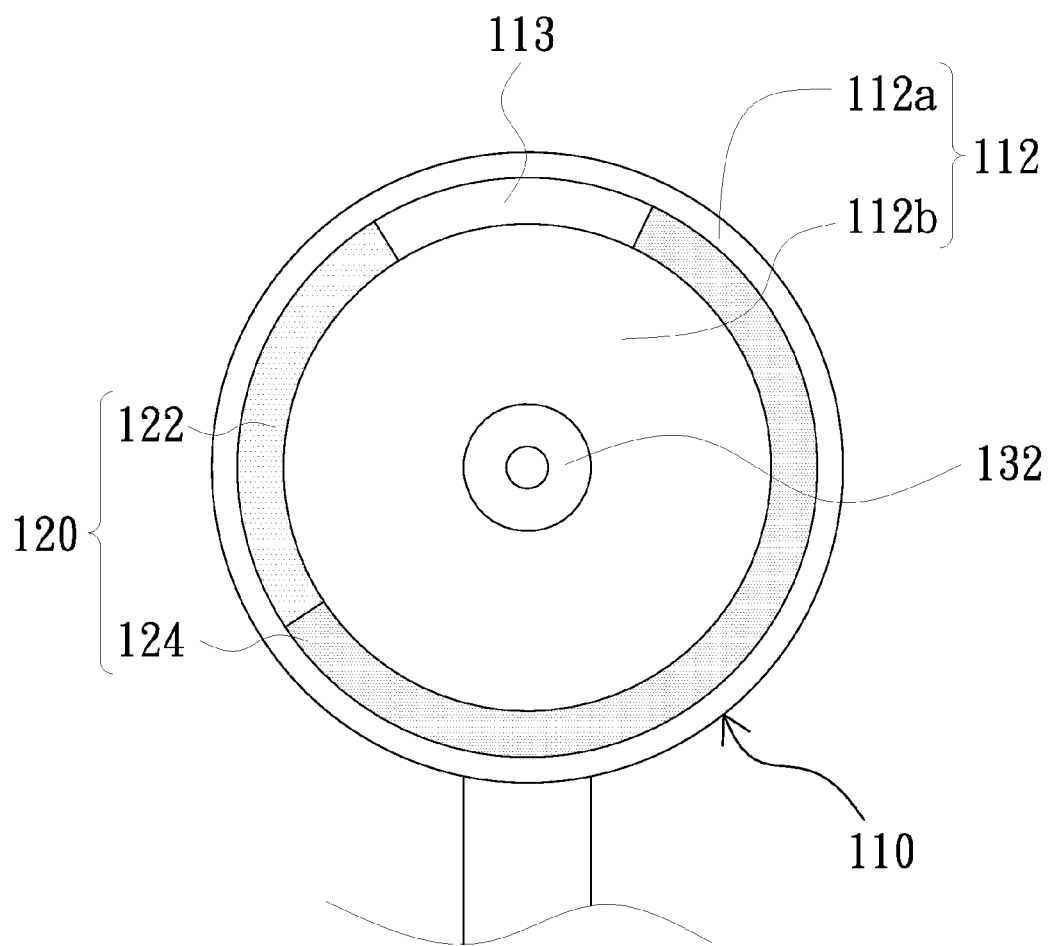
FIG. 2 illustrates a front view of a phosphor wheel according to another embodiment of the invention.
Figure 3:
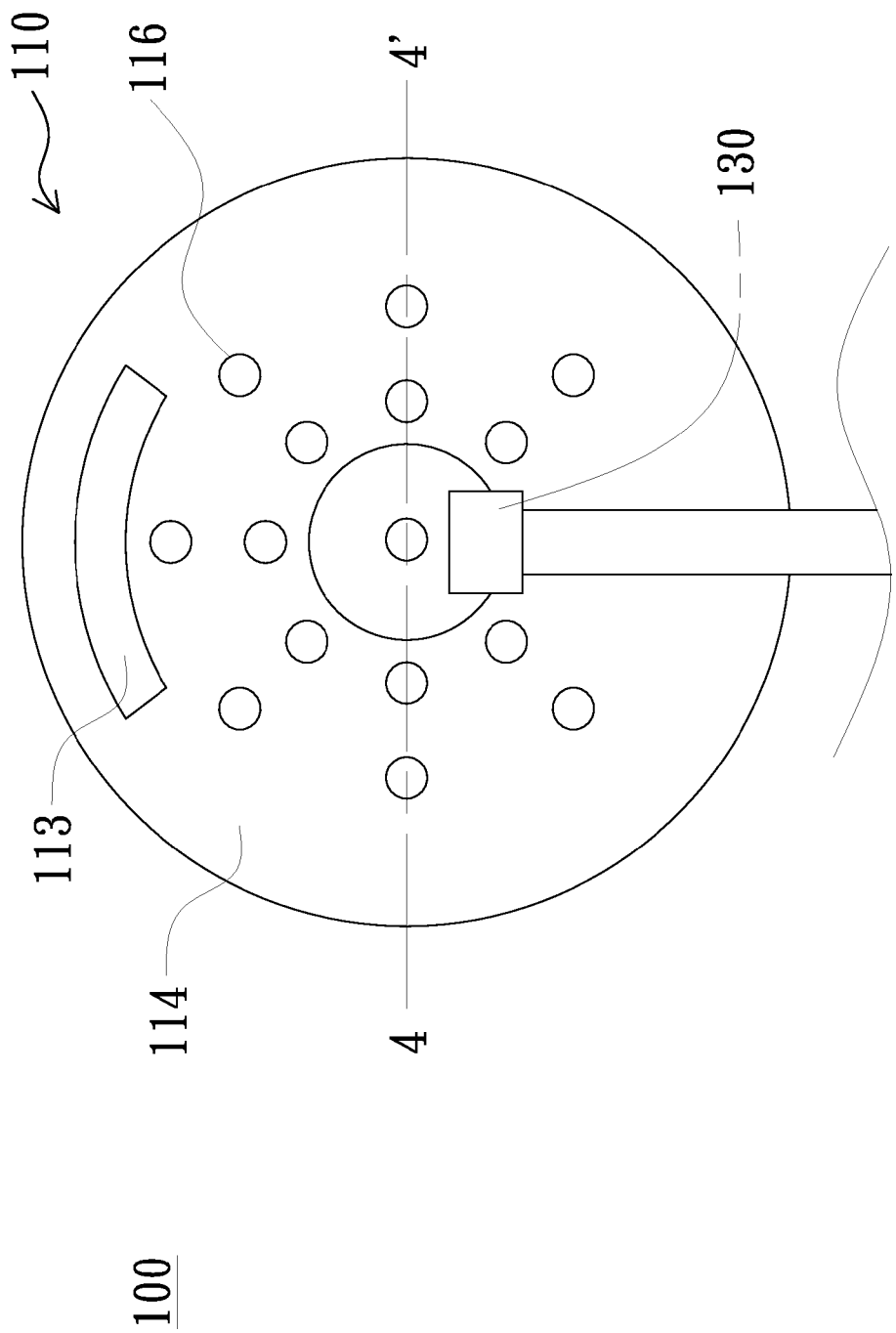
FIG. 3 illustrates a rear view of the phosphor wheel of FIG. 2.

Please refer to FIG. 2 and FIG. 3, FIG. 2 shows a front view of a phosphor wheel 100 according to another embodiment of the invention and FIG. 3 shows a rear view of the phosphor wheel 100 of FIG. 2. The phosphor wheel 100 includes a rotating disk 110 and a wavelength converting layer 120, in which the wavelength converting layer 120 is disposed on the rotating disk 110, and the phosphor wheel 100 of this embodiment is capable of being applied into the projection device 10 of the embodiment show in FIG. 1. In addition, the phosphor wheel 100 further includes an actuated device 130 connected to the rotating disk 110 via a holder 132. The actuated device 130 may rotate the rotating disk 110 after the actuated device 130 receives an electronic power. For example, the actuated device 130 may be, but not limited to, a motor.

Referring to FIG. 1, the rotating disk 110 has a first surface 112 and a second surface 114. Referring to FIG. 2, the first surface 112 forms a coating region 112a and a non-coating region 112b, in which the wavelength converting layer 120 is disposed on the coating region 112a. In addition, the surface facing to the light emitting element 102 is, but not limited to, the first surface 112 of the rotating disk 110. In another embodiment, the projection device may have several optical elements located between the light emitting element and the phosphor wheel to change the transmission path of the light beam such that the first surface of the rotating disk is not facing to the light emitting element.

Referring to FIG. 3, the material of the rotating disk 110 may be, but not limited to, a metal or a highly heat conductive material such as stainless steel, aluminum, copper, graphite or pottery etc. In addition, the rotating disk 110 has at least one recess portion 116. In the embodiment, the recess portion 116 may be, but not limited to, formed on the second surface 114. When the rotating disk 110 rotates, the recess portion 116 may disturb the air around the cavity 103a to accelerate the highly heat conductivity of the rotating disk 110. In the embodiment, the shape of the recess portion 116 is, but not limited to, a circular. In another embodiment, the shape of the recess portion 116 may have various shapes.

The wavelength converting layer 120 is formed on the coating region 112a of the first surface 112. In addition, the rotating disk 110 may, but be not limited to, include a light transmissive region 113 for the light beam 20 passing through the rotating disk 110. For example, the light transmissive region 113 may be a transmissive diffusion sheet or a glass plate. In this embodiment, the light transmissive region 113 may be, but not limited to, a transmissive hole that perforates from the first surface 112 to the second surface 114 for penetration of the light beam 20. Furthermore, the coating region 112a may be, but not limited to, formed on an outer edge of the first surface 112. In this embodiment, the wavelength converting layer 120 disposed on the coating region 112a has a first wavelength converting material 122 for converting the light beam 20 into a first wavelength light beam and a second wavelength converting material 124 for converting the light beam 20 into a second wavelength light beam. It should be understood that the wavelength converting layer 120 do not be limited to only have two kinds of the wavelength converting materials. In another embodiment, the wavelength converting layer 120 may have two or more kinds of the wavelength converting materials. For example, the wavelength converting layer 120 may be formed by the phosphor powder and the first wavelength converting material 122 and the second wavelength converting material 124 are, but not limited to, phosphor powders having different colors for exciting light beams having different colors.

For example, when the light emitting element 102 (referring to FIG. 1) is a blue light laser, the first wavelength converting material 122 of the wavelength converting layer 120 may be a phosphor for exciting a green light and the second wavelength converting material 124 may be a phosphor for exciting a yellow light. In some embodiment, the wavelength converting layer 120 may further have a phosphor (not shown) for exciting a red light such that the projection device 10 (referring to FIG. 1) may show an image having three kinds of colors such as red, green, and blue. When the image having three kinds of colors such as red, green, and blue is sequentially and rapidly projected into the screen, the user may see the image composited by the three kinds of colors because of the persistence of vision.

As shown in FIG. 1 and FIG. 3, when the high energy light beam emitted by the laser makes the phosphor be excited the color light, the temperature of the cavity 103a may be simultaneously increased. In order to prevent the wavelength converting layer 120 from the high temperature, the recess portion 116 may disturb the air around the cavity 103a to accelerate the efficiency of the heat exchange between the cover 103 (referring to FIG. 1) and the rotating disk 110 when the rotating disk 110 rotates, and thus the temperature of the wavelength converting layer 120 can be effectively decreased. In addition, the deposition of the recess portion 116 may increase the heat dissipating area of the rotating disk 110. According to a result of a test, compared to the temperature of the wavelength converting layer 120 disposed on the rotating disk 110 without recess portion 116, the temperature of the wavelength converting layer 120 disposed on the rotating disk 110 having twenty recess portion 116 may decrease about 10° C. when the rotating disk 110 rotates. In some embodiments, the rotating disk 110 has several recess portions 116 and the recess portions 116 are, but not limited to, radially disposed form the center of rotating disk 110.

Figure 4:
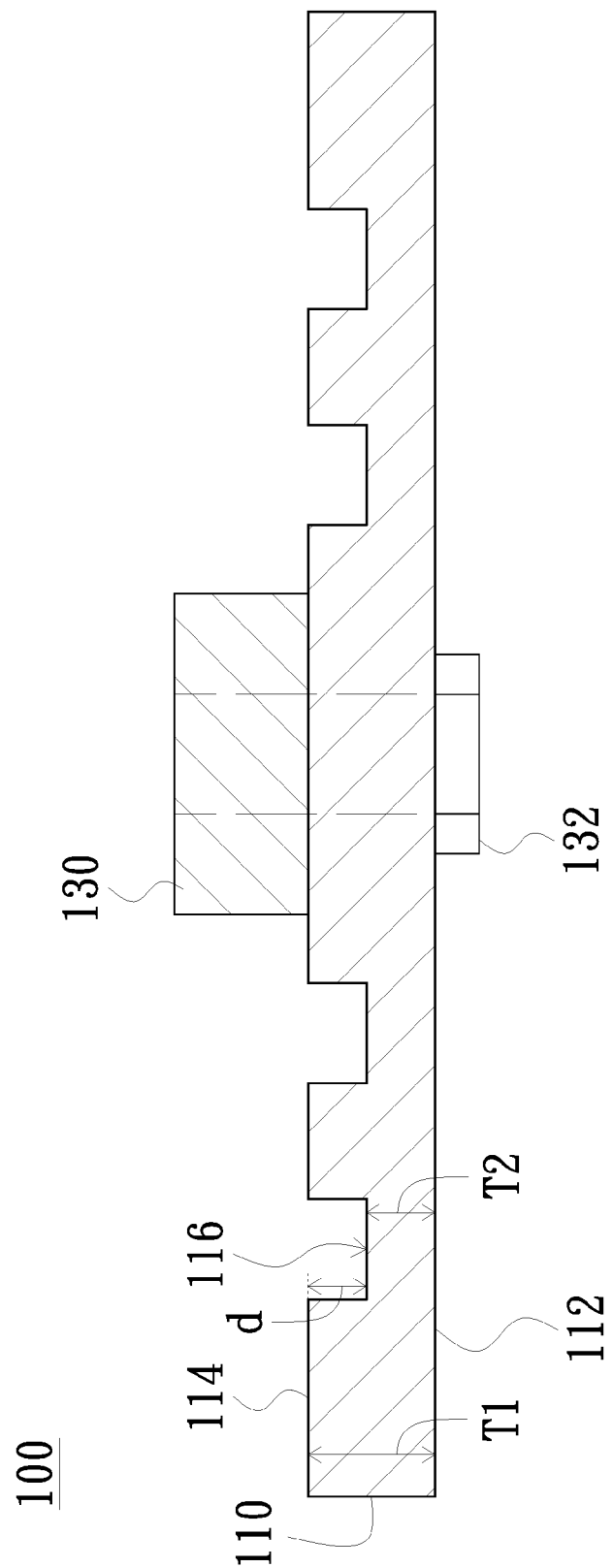
FIG. 4 illustrates a cross-sectional view of the phosphor wheel of FIG. 3 taken along line 4-4'.

Referring to FIG. 4, it shows a cross-sectional view of the phosphor wheel of FIG. 3 taken along line 4-4'. As shown in FIG. 4, a maximum thickness T1 of the rotating disk 110 having the recess portions 116 is 0.85 mm and a minimum thickness T2 of the rotating disk 110 is 0.5 mm such that the rotating disk 110 has a stable dynamic balance when the rotating disk 110 rotates. It should be understood that the above thickness of the rotating disk 110 is not limited to the invention. In addition, the depth d of each of the recess portions 116 of the rotating disk 110 is, but not limited to, 0.35 mm. In some embodiments, when a plurality of the recess portions 116 dispose on the rotating disk 110, the recess portions 116 have different depths, respectively. The depth of each recess portions is not limited to the invention.

Figure 5:
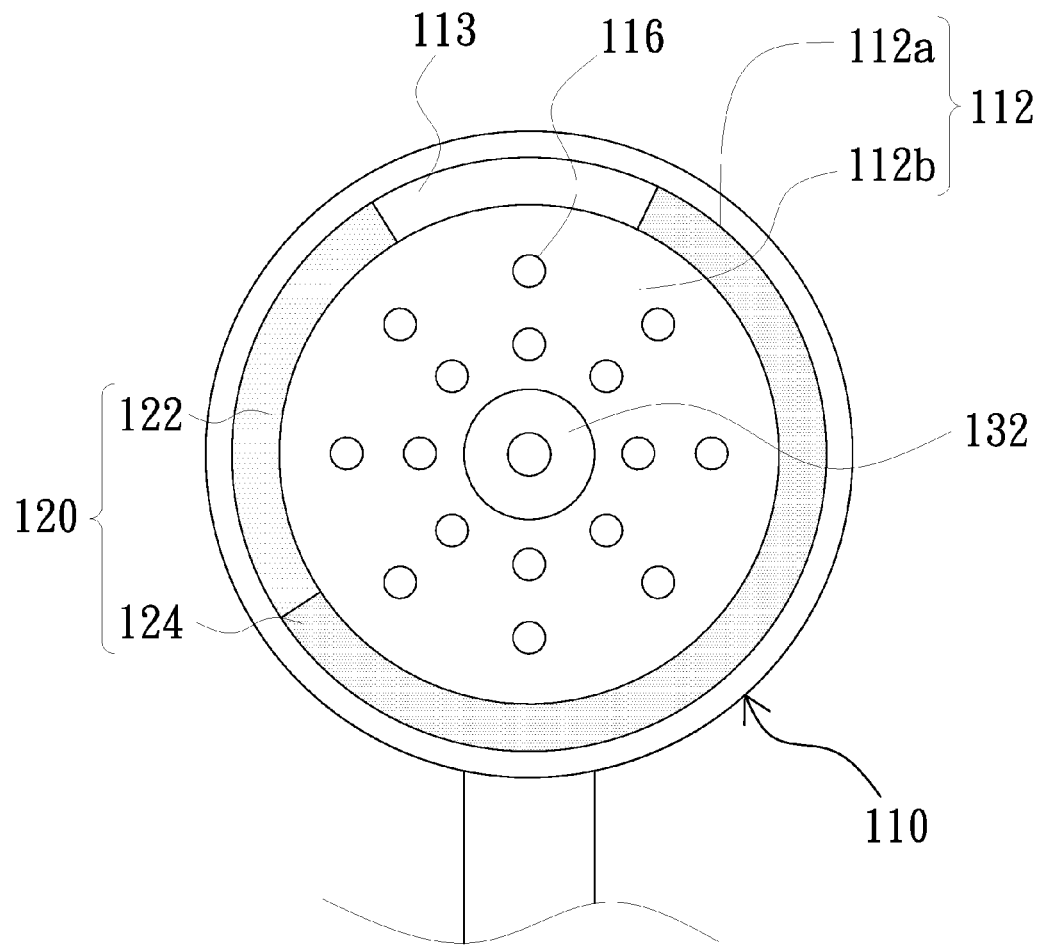
FIG. 5 illustrates a front view of a phosphor wheel according to another embodiment of the invention.
Figure 6:
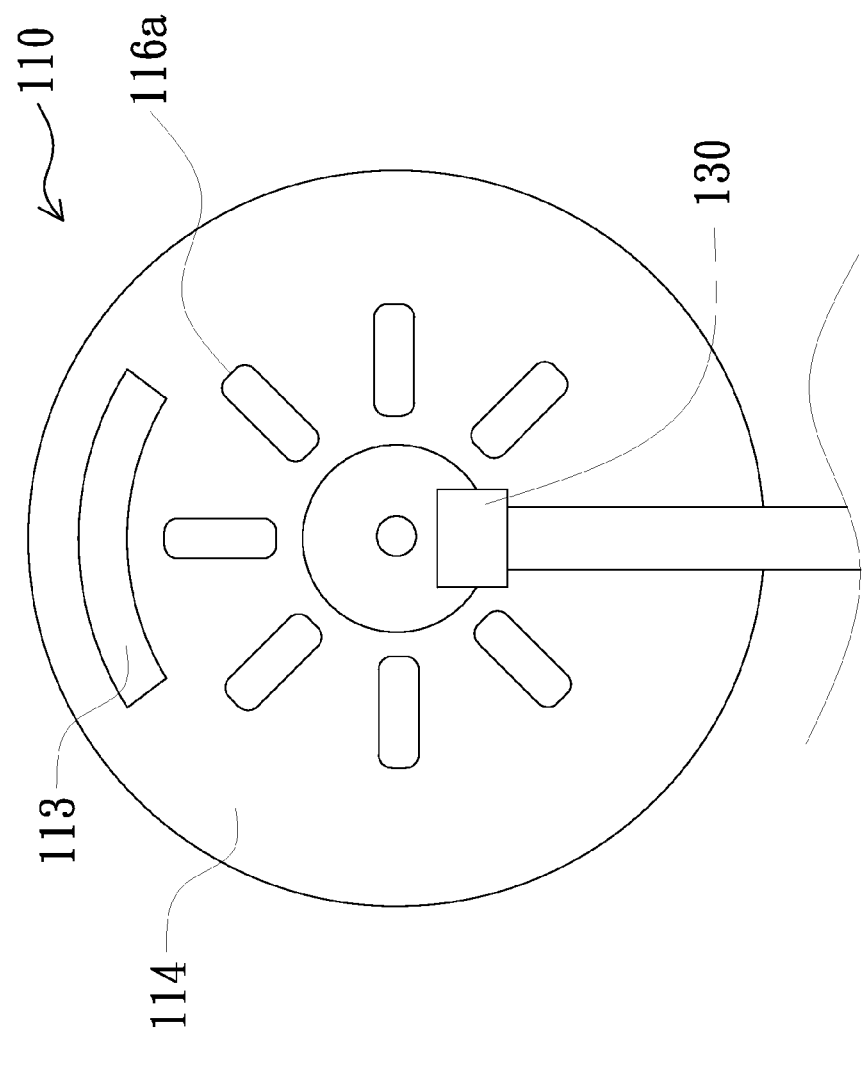
FIG. 6 illustrates a rear view of a phosphor wheel according to another embodiment of the invention.
Figure 7:
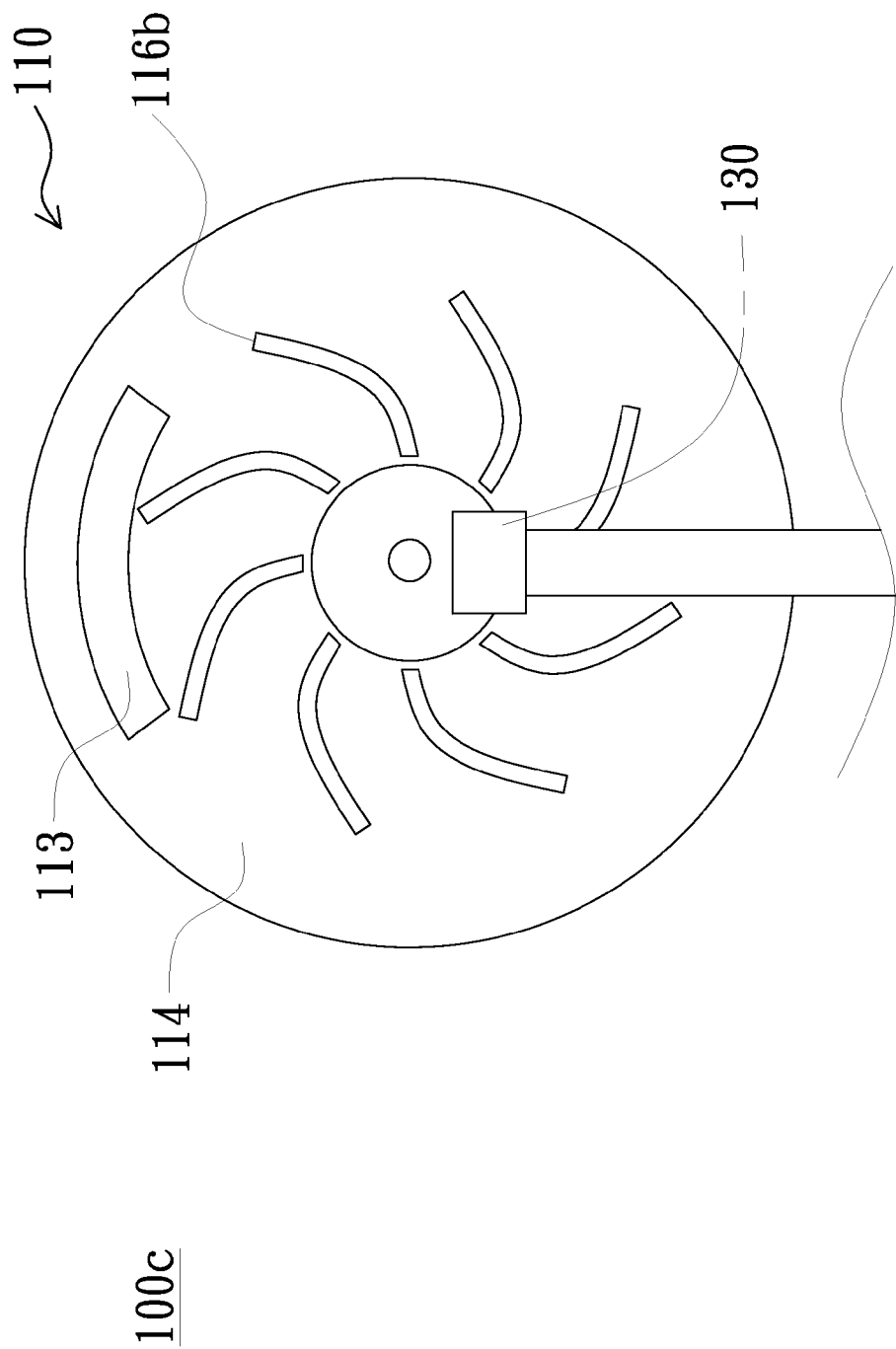
FIG. 7 illustrates a rear view of a phosphor wheel according to another embodiment of the invention.

Referring to FIG. 5~FIG. 7, FIG. 5 shows a front view of a phosphor wheel 100a according to another embodiment of the invention, FIG. 6 shows a rear view of a phosphor wheel 100b according to another embodiment of the invention, and FIG. 7 shows a rear view of a phosphor wheel 100c according to another embodiment of the invention. As shown in FIG. 5, the recess portions 116 are formed in the non-coating region 112b of the first surface 112. As shown in FIG. 6, the shape of the recess portions 116a is rectangular. As shown in FIG. 7, the shape of the recess portions 116b is curved. Therefore, the recess portions 116/116a/116b may be formed in the second surface 114 or the non-coating region 112b of the first surface 112, and the shapes of the recess portions 116/116a/116b are not limited.

From the above, the embodiments of the invention have following advantages. When the rotating disk of the phosphor wheel rotates, the recess portions may disturb the air around the phosphor wheel such that the temperature of the wavelength converting layer may be effectively decreased. Simultaneously, since the configuration of the rotating disk is not dramatically changed and do not have extra holes, the rotating disk has a stable dynamic balance when the rotating disk rotates. In addition, the rotating disk has a larger heat dissipating region because of the recess portions disposed on the rotating disk. Furthermore, the rotating disk having the recess portions can decrease the weight of the rotating disk, and the loading of the actuating device can be decreased to extend the life time of the actuated device.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A phosphor wheel comprising:
a rotating disk having a first surface and a second surface opposite to the first surface, the first surface forming a coating region and a non-coating region, wherein the second surface or the non-coating region of the first surface comprises a plurality of recess portions, and a depth of each of the recess portions is less than a maximum thickness of the rotating disk; and
a wavelength converting layer formed on the coating region of the first surface for converting a light wavelength of a light beam.

2. The phosphor wheel according to claim 1, further comprising an actuated device connected to the rotating disk for actuating the rotating disk to rotate.

3. The phosphor wheel according to claim 1, wherein the rotating disk has a light transmissive region.

4. The phosphor wheel according to claim 1, wherein the wavelength converting layer has a first wavelength converting material for converting the light beam into a first wavelength light beam and a second wavelength converting material for converting the light beam into a second wavelength light beam.

5. The phosphor wheel according to claim 1, wherein the coating region is formed on an outer edge of the first surface.

6. The phosphor wheel according to claim 1, wherein a shape of each of the recess portions is circular, rectangular or curved.

7. The phosphor wheel according to claim 1, wherein the maximum thickness of the rotating disk is about 0.85 mm and a minimum thickness of the rotating disk is about 0.5 mm.

8. A projection device, comprising:
a light emitting element for emitting a light beam;
a phosphor wheel disposed on a transmission path of the light beam, the phosphor wheel comprising:
a rotating disk having a first surface and a second surface opposite to the first surface, the first surface forming a coating region and a non-coating region, wherein the second surface or the non-coating region of the first surface comprises a plurality of recess portions, and a depth of each of the recess portions is less than a maximum thickness of the rotating disk; and
a wavelength converting layer formed on the coating region of the first surface for converting a light beam into a wavelength converting beam such that the light beam is mixed with the wavelength converting beam to form a mixed light beam;
a light valve disposed on a transmission path of the mixed light beam and configured to modulate the mixed light beam into an image light beam; and
a projecting lens disposed on a transmission path of the image light beam.

9. The projection device according to claim 8, wherein the phosphor wheel comprises an actuated device connected to the rotating disk for actuating the rotating disk to rotate.

10. The projection device according to claim 8, further comprising a cover for containing the phosphor wheel.

11. The projection device according to claim 8, wherein the coating region has a light transmissive region for the penetration of the light beam.

12. The projection device according to claim 8, wherein the wavelength converting layer has a first wavelength converting material for converting the light beam into a first wavelength light beam and a second wavelength converting material for converting the light beam into a second wavelength light beam.

13. The projection device according to claim 8, wherein the coating region is formed on an outer edge of the first surface.

14. The projection device according to claim 8, wherein a shape of each of the recess portions is circular, rectangular or curved.

15. The projection device according to claim 8, wherein the maximum thickness of the rotating disk is about 0.85 mm and a minimum thickness of the rotating disk is about 0.5 mm.

\* \* \* \* \*